United States Patent [19]

Nozawa et al.

[11] Patent Number: 4,628,444
[45] Date of Patent: Dec. 9, 1986

[54] OPERATING INFORMATION INPUT METHOD IN NUMERICAL CONTROL APPARATUS

[75] Inventors: Ryoichiro Nozawa; Nobuyuki Kiya; Motoaki Yoshino, all of Tokyo, Japan

[73] Assignee: Fanuc Ltd, Minamitsuru, Japan

[21] Appl. No.: 616,216

[22] PCT Filed: Sep. 30, 1983

[86] PCT No.: PCT/JP83/00325

§ 371 Date: May 14, 1984

§ 102(e) Date: May 14, 1984

[87] PCT Pub. No.: WO84/01443

PCT Pub. Date: Apr. 12, 1984

[30] Foreign Application Priority Data

Oct. 1, 1982 [JP] Japan ................... 57-172862

[51] Int. Cl.⁴ ................... G05B 19/00; G06F 3/00
[52] U.S. Cl. ................... 364/188; 364/171; 364/900; 340/709; 340/722
[58] Field of Search ............ 364/188, 189, 191, 192, 364/171, 146; 340/709-712, 720, 722

[56] References Cited

U.S. PATENT DOCUMENTS

| | | | |
|---|---|---|---|
| 4,303,973 | 12/1981 | Williamson, Jr. et al. | 364/189 |
| 4,399,502 | 8/1983 | MacDonald et al. | 364/189 |
| 4,413,314 | 11/1983 | Slater et al. | 364/188 |
| 4,451,895 | 5/1984 | Sliwkowski | 364/188 |
| 4,479,197 | 10/1984 | Haag et al. | 364/900 |
| 4,481,603 | 11/1984 | McCaskill et al. | 364/900 |
| 4,490,781 | 12/1984 | Kishi et al. | 364/191 |
| 4,514,798 | 4/1985 | Lesche et al. | 364/188 |
| 4,519,026 | 5/1985 | Nozawa et al. | 364/188 |
| 4,521,860 | 6/1985 | Kanematsu | 364/191 |

FOREIGN PATENT DOCUMENTS

WO82/00726 3/1982 PCT Int'l Appl. ............ 340/709

OTHER PUBLICATIONS

Displays and Annunciators Interfaces to Effective Operator Control; *Control Engineering;* by A. J. Laduzinsky; pp. 90–94; Oct. 1982.

*Primary Examiner*—Jerry Smith
*Assistant Examiner*—Allen MacDonald
*Attorney, Agent, or Firm*—Staas & Halsey

[57] ABSTRACT

An operating information input method in a numerical control apparatus which executes prescribed numerical control processing based on numerical control program data and operating information includes steps of designating the start of operating information input displaying, on the screen of a display device, various operating information items (e.g. MODE, HANDLE AXIS, and HANDLE *10) e.g. and selectable items (MDI, AUTO, EDIT, HNDL, JOG, ZRN, HX, HZ) in the form of characters in response to designating the start of inputting operating information positioning a first cursor (CSR) on a line of an operating information item to be input, thereafter positioning a second cursor associated with the operating information item designated by the first cursor, on a line of a prescribed selectable item to identify the desired operating information based on the positions of the first and second cursors.

10 Claims, 15 Drawing Figures

OPERATING INFORMATION INPUT METHOD IN NUMERICAL CONTROL APPARATUS

BACKGROUND OF THE INVENTION

This invention relates to an operating information input method in a numerical control (NC) apparatus and, more particularly, to an operating information input method wherein operating information entered from an operator's panel is input upon being displayed on the screen of a CRT.

A numerical control apparatus executes predetermined numerical control processing on the basis of numerical control program data and operating information set by an operator's panel. The operating information may include:

(1) mode information for specifying operating modes such as an editing mode, automatic operating mode, manual data input (MDI) operating mode, jog operating mode and handle feed operating mode;
(2) single block on/off information;
(3) dry run on/off information;
(4) block skip on/off information;
(5) machine lock on/off information;
(6) feed hold on/off information;
(7) reference point return on/off information;
(8) jog feed direction information;
(9) jog feed velocity and overdrive information;
(10) handle axis selection information; and
(11) handle feed multiplier information.

Figure 1:
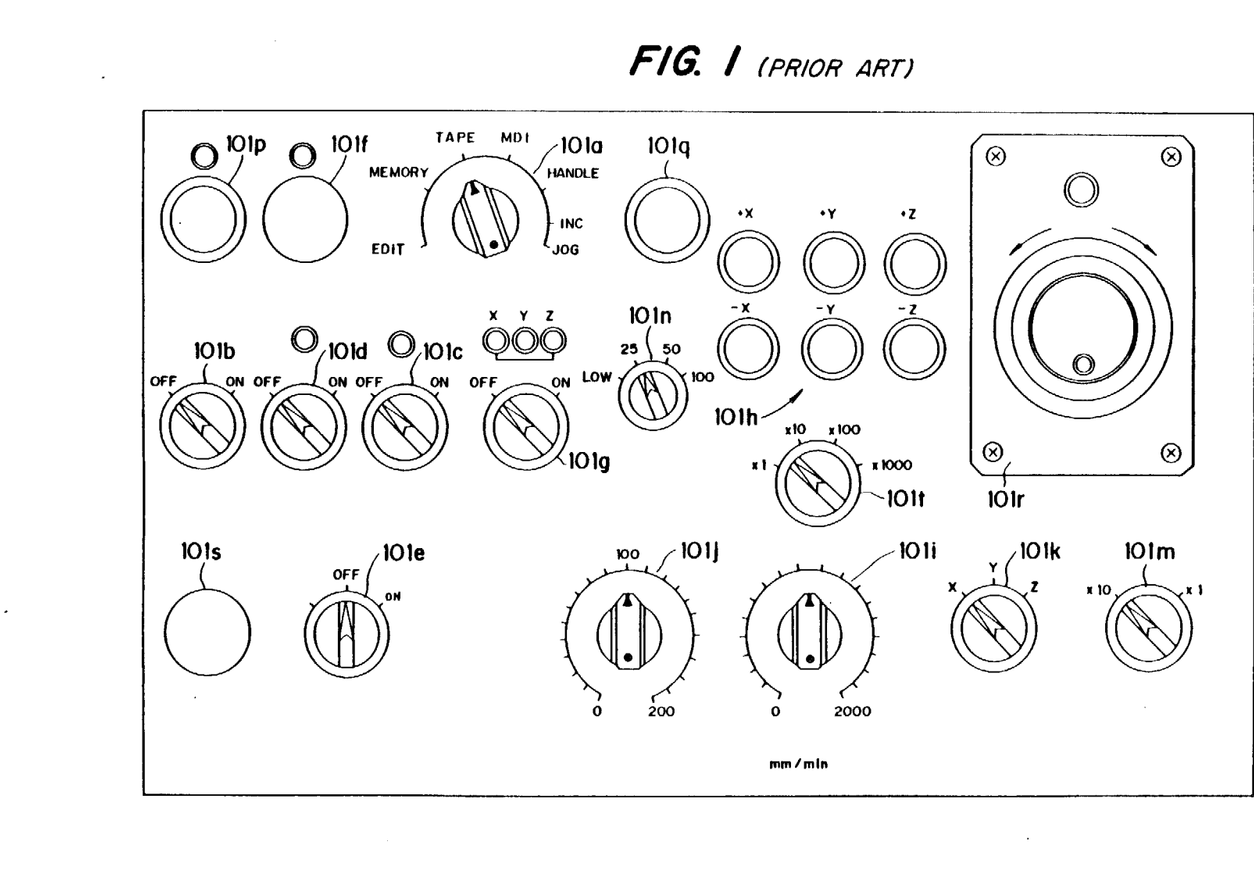
FIG. 1 is a plan view of an operator's panel on the machine side according to the prior art.

In the prior art, all of these items of operating information are fed into the numerical control apparatus by switches or dials or by pressing buttons, which are provided on the operator's panel located on the machine side. In consequence, the entry of the operating information has necessitated a large number of switches or buttons, which results in equipment that is high in cost. FIG. 1 is a plan view of such an operator's panel on the machine side. The operator's panel is provided with a changeover switch 101a for mode selection, a single block on/off changeover switch 101b, a dry run on/off changeover switch 101c a a block skip on/off changeover switch 101d, a machine lock on/off changeover switch 101e, a feed hold button 101f, a reference point return on/off changeover switch 101g, six jog feed buttons 101h for designating jog feed along the positive and negative directions of various axes, a jog feed velocity setting dial 101i, a feed velocity overdirve setting dial 101j, a handle feed axis selection switch 101k, a handle feed multiplier selection switch 101m, a rapid-traverse override quantity selection switch 101n, a cycle start button 101p, a rapid-traverse button 101q, a handle 101r, an emergency stop button 101s, and incremental feed quantity selection switch 101t.

Because all items of operating information must be entered from the operator's panel located on the machine side in the prior art arrangement, the operator must enter the operating information by going to the operator's panel on the machine side which is disposed remote from the NC apparatus proper, whenever the operating information is to be entered. The disadvantageous result is poor operability.

Figure 2A:
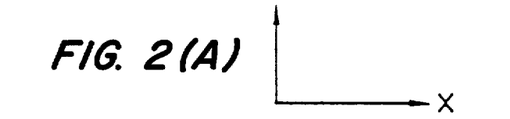
FIGS. 2(A) and 2(B) are views for explaining the inconvenience of a jog feed operation in the prior art.
Figure 2B:
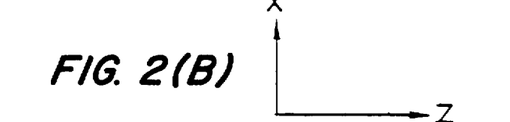

Furthermore, in the prior art, a jog feed is performed by pressing the jog buttons conforming to the axis along which the jog feed is desired to be made and the direction of travel along said axis. However, the coordinate system will differ from machine to machine. For example, FIG. 2(A) illustrates a coordinate system for a milling machine, an FIG. 2(B) a coordinate system for a lathe. Thus, depending upon the machine tool, the prescribed jog feed buttons must be selected after first considering the machine tool coordinate system at the time the jog feed is to be performed. Consequently, drawbacks possessed by the prior art are poor operability when performing a jog feed, as well as a tendency for the operator to commit operating errors.

SUMMARY OF THE INVENTION

Accordingly, an object of the present invention is to provide an operating information input method for a numerical control apparatus wherein operating information can be set and entered without using a number of changeover switches, buttons and dials.

Another object of the present invention is to provide an operating information input method, wherein operating information can be entered from a manual data input unit (MDI unit) equipped with a display device and mounted on an NC apparatus.

Still another object of the present invention is to provide an operating information input method which has excellent operability and which is so adapted as to permit a jog feed to be made without consideration of the coordinate system of the machine.

A further object of the present invention is to provide an operating information input method capable of lowering the cost of an NC apparatus.

The present invention relates to a method of inputting operating information in an NC apparatus wherein various operating information items and selectable items associated with respective ones of the operating information items are displayed in the form of characters on the CRT screen of a display device, a cursor is positioned using the keys of an MDI unit, at the position of a selectable item (e.g., at a positioned marked "on" or "off") associated with a prescribed operating information item, thereby to enter on/off information, etc., relating to the operating information item, and a bar graph is displayed adjacent the various operating information items by using keys on the MDI unit, with an operating quantity relating to an operating information item being entered based on the length of the bar graph. According to this method of entering operating information, changeover switches, dials and buttons for entering operating information become unnecessary, enabling equipment cost to be reduced.

BRIEF DESCRIPTION OF THE DRAWINGS

FIGS. 3(A), 3(B), and 4(A) to 4(F) illustrate the present invention;

DESCRIPTION OF THE PREFERRED EMBODIMENTS

Figure 3A:
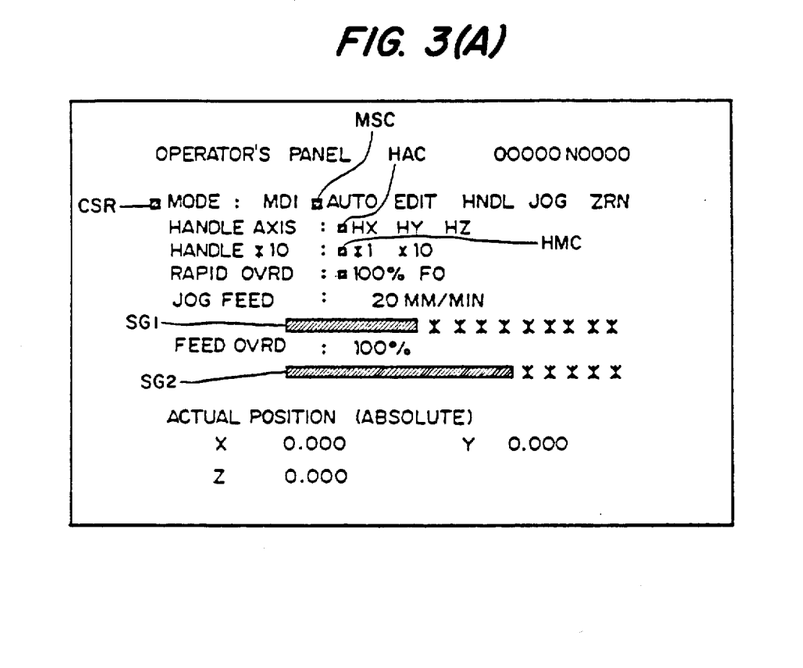
Figure 3B:
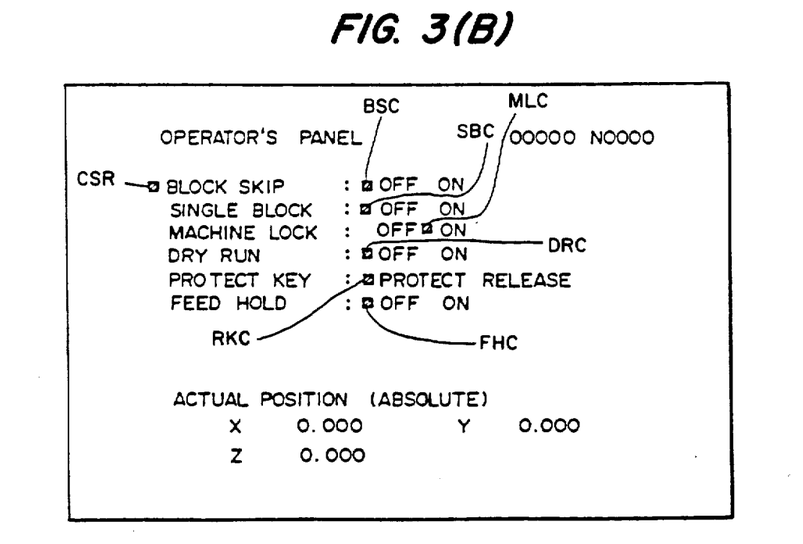
Figure 4A:
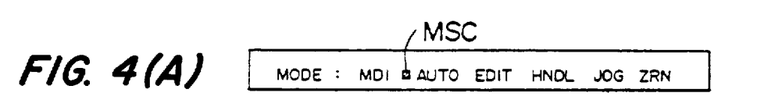
Figure 4B:
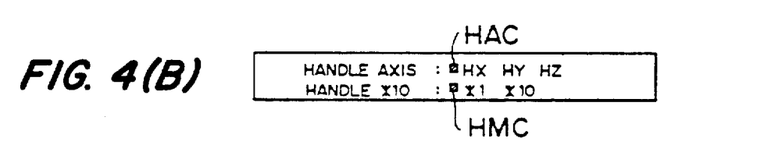
Figure 4C:
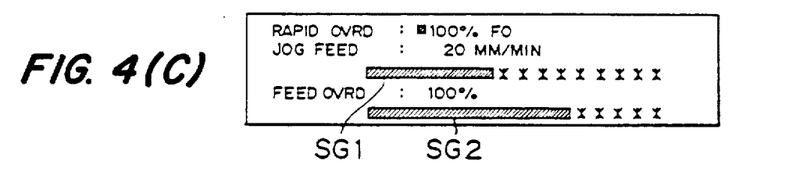
Figure 4D:
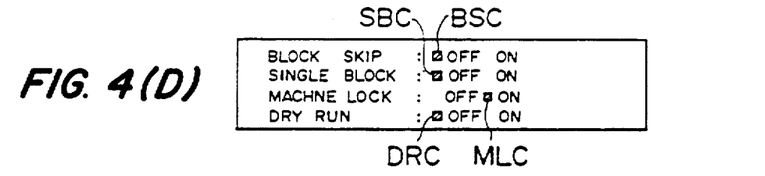
Figure 4E:
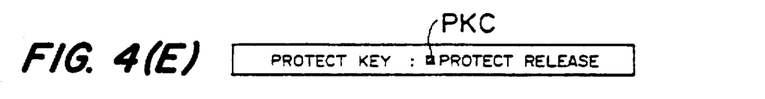
Figure 4F:
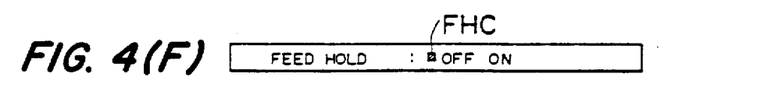

FIGS. 3(A) and 3(B) illustrate operating information menus and selectable items which appear on the CRT screen of an MDI unit. The operating information is set by operating keys on the MDI unit while the display is observed.

In FIG. 3(A), items in the operating information menu are "MODE", "HANDLE AXIS", "HANDLE *10", "RAPID OVRD", "JOG FEED" and "FEED OVRD". The item of operating information "MODE" is for selecting mode information. The words appearing on the "MODE" line, namely "MDI", "AUTO", "EDIT", "HNDL", "JOG" and "ZRN" represent the selectable items. The arrangement is such that the MDI mode, automatic operating mode, editing mode, handle feed mode, jog feed mode and zero point return mode can be selected by positioning a cursor MSC just to the left of the selectable items "MDI", "AUTO", "EDIT", "HNDL", "JOG" and "ZRN", respectively. For example, to select the automatic operating mode (AUTO), a vertical shift key on the MDI unit is operated to place a cursor CSR to the left of the operating information item "MODE", after which a horizontal shift key on the MDI unit is operated to position the cursor MSC to the left of the selectable item "AUTO". The automatic operating mode is thus selected.

The operating information item "HANDLE AXIS" is for selecting the handle feed axis, where the "HX", "HZ" denote the selectable items. In the manner described hereinabove, the X axis or Z axis can be established as the handle feed axis by positioning the cursor CSR to the left of the operating information item "HANDLE AXIS" and positioning a handle feed axis selection cursor HAC to the left of the selectable item "HX" or "HZ".

The operating information item "HANDLE *10" is for selecting the multiplier of the handle feed. Here, "*1" and "*10" represent the selectable items. As described above, by positioning the cursor CSR to the left of "HANDLE *10" and then positioning a handle multiplier selection cursor HMC to the left the selectable item "*1" or "*10", a single graduation on the handle can be set to X1 (0.001 mm) or to X10 (0.01 mm), respectively.

The operating information item "RAPID OVRD" is for selecting rapid-traverse override, the operating information item "JOG FEED" is for setting jog feed velocity, and "FEED OVRD" is for setting the feed velocity override. To set the job feed velocity, the vertical shift key is used to position the cursor CSR to the left of the operating information item "JOG FEED". Then, the horizontal shift key is used to lenghten a bar graph SG1 by extending it to the right, or to shorten the bar graph SG1 by retracting it to the left. The jog feed velocity is thus set by the length of the bar graph. More specifically, when the horizontal shift key is operated, the bar graph is lenthened or shortened during such operation to set a quantity, which corresponds to the length of the bar graph, as the jog feed velocity. The jog feed quantity is displayed in the form of characters. In FIG. 3(A), the jog feed velocity has been set to 20 mm/min. To set the feed velocity override, the cursor is positioned to the left of the operating information item "FEED OVRD", followed by using the horizontal shift key to lengthen a bar graph SG2 by extending it to the right, or to shorten the bar graph SG1 by retracting it to the left. In FIG. 3(A), the fed velocity override quantity has been set to 100%.

In FIG. 3(B), "BLOCK SKIP", "SINGLE BLOCK", "MACHINE LOCK", "DRY RUN", "PROTECT KEY" and "FEED HOLD" are the operating information items. "ON", "OFF", "PROTECT" and "RELEASE" are the selectable items. "BLOCK SKIP" is for selecting block skip on/off, "SINGLE BLOCK" is for selecting single block on/off, "MACHINE LOCK" is for selecting machine lock on/off, "DRY RUN" is for selecting dry run on/off, "PROTECT KEY" is for selecting whether or not editing of data stored in memory is to be forbidden, and "FEED HOLD" is for selecting feed hold on/off. The selectable information (on, off, etc.) for each operating information item is set in a manner similar to the mode selection operation of FIG. 3(A). Thus, the cursor CSR is positioned on the line of the prescribed operating information item, after which cursors BSC, SBC, MLC, DRC, PKC, FHC on the operating information item lines are positioned to the left of the respective prescribed selectable items. In the example of FIG. 3(B), the settings are such that block skip is off, single block is off, machine lock is on, protect key is on protect, and feed hold is off.

The foregoing is for a case where all operating information is entered using a CRT screen. However, as shown in FIGS. 4(A) through 4(F), an arrangement is permissible wherein the operating information is divided into groups 1 through 7, namely a mode selection group [FIG. 4(a)], handle feed group [4(B)], feed velocity related group [4(C)], automatic operation related group [4(D)], program protect group [4(E)], feed hold group [4(F)], and a jog feed related group (not shown), with only several of these groups being entered from the CRT screen.

Figure 5:
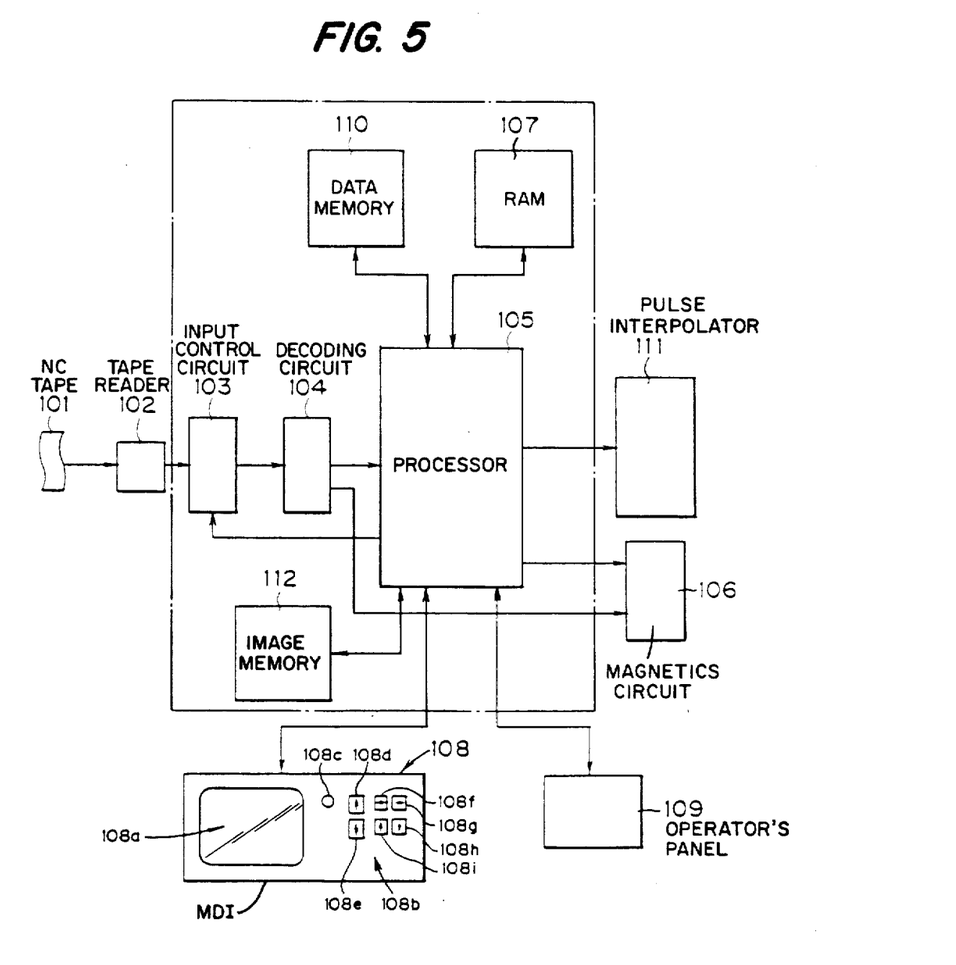
FIG. 5 is a block diagram of an embodiment of the present invention.

FIG. 5 is a block diagram of an NC apparatus to which the present invention is applied. In FIG. 5 numeral 101 denotes an NC tape bearing a punched NC program comprising multiple items of numerical control data (NC data). Numeral 102 denotes a tape reader, and 103 an input control circuit which controls the tape reader 102 to read the NC data sequentially from the NC tape 101 and input the data to a decoding circuit 104, which is the next stage. The decoding circuit 104 decodes the read NC data and, if an item of NC data is a position command (Xe, Ye, Ze), a G-function instruction or the like, delivers the data to a processor 105, which is the next stage. If an item of NC data is an M-, S- or T-function instruction, the decoding circuit delivers the data to the machine side (not shown) through a magnetics circuit 106. The processor 105 executes prescribed numerical control processing on the basis of numerical control program data input from the NC tape, and on the basis of operating information. The processor 105 also executes operating information input processing. Numeral 107 denotes a RAM (operating information storage memory) backed by a battery for storing operating information, specifically operating information entered using a cathode-ray tube 108a and keyboard 108b of an MDI unit 108, and operating information entered from switches on an operator's panel 109 located on the machine side. Numeral 110 denotes a data memory for storing, e.g., the results of numerical control processing. Numeral 111 designates a pulse interpolator, and 112 an image memory.

In entering operating information from the MDI unit 108, the first step is to manipulate an operating information setting key 108c on the MDI unit 108, following by pressing a page turning key 108d or 108e (key 108d is for incrementing the page, and key 108e for decrementing the page). If a page turning key is held depressed, images stored in the image memory 112 will be displayed on the CRT in successive fashion. Since operating information covering several pages will have been stored in the image memory 112, the page turning key 108d or 108e is released when the desired operating information image is displayed, after which cursor keys 108f through 108i are operated to position the cursors at each of the operating information item positions and selectable item positions in the manner described earlier. By doing so, items of operating information are selected or set one after another and stored in the operating information memory 107. This ends the entry of the operating information.

Figure 6:
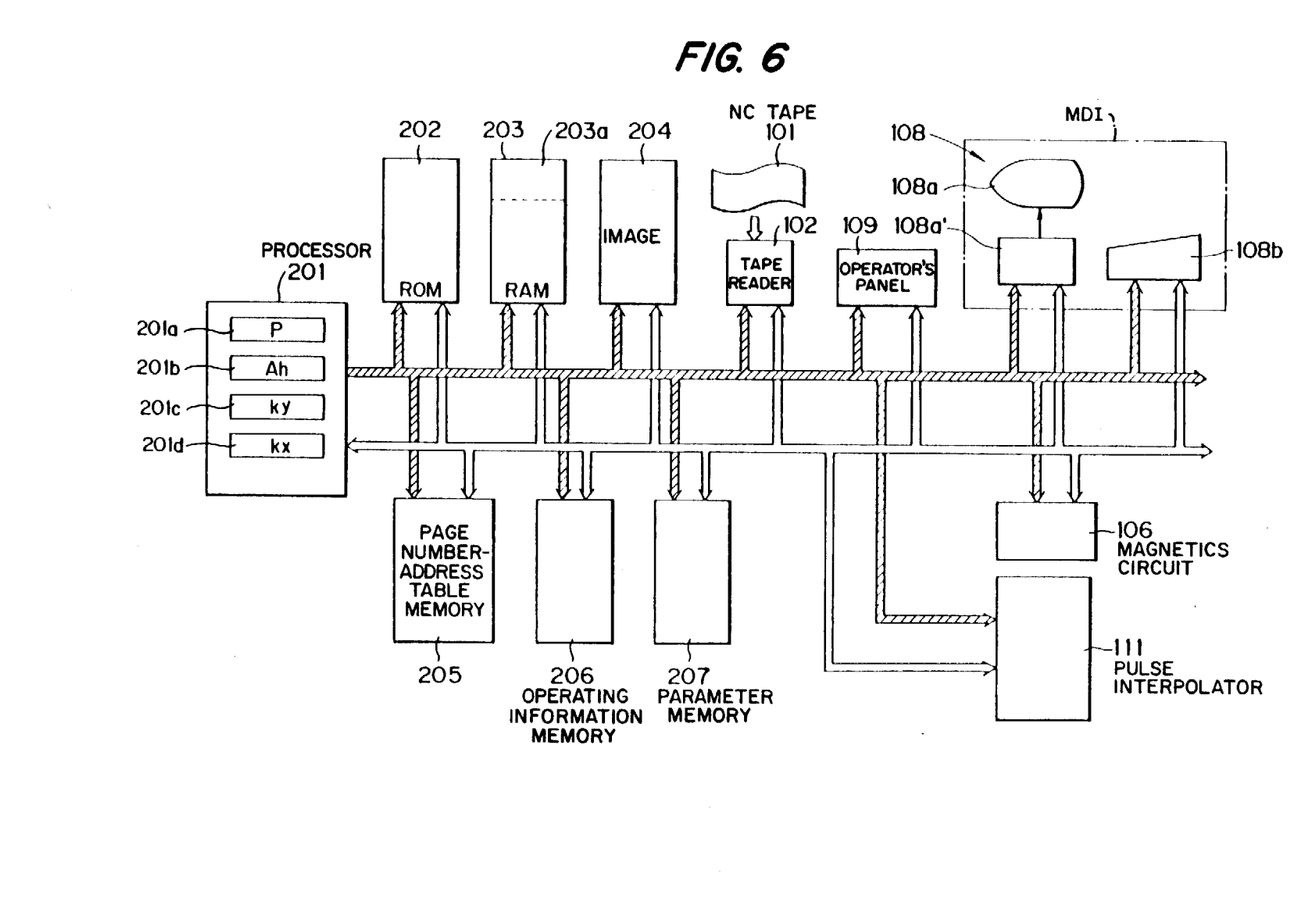
FIG. 6 is a block diagram of a second embodiment of the present invention.
Figure 7:
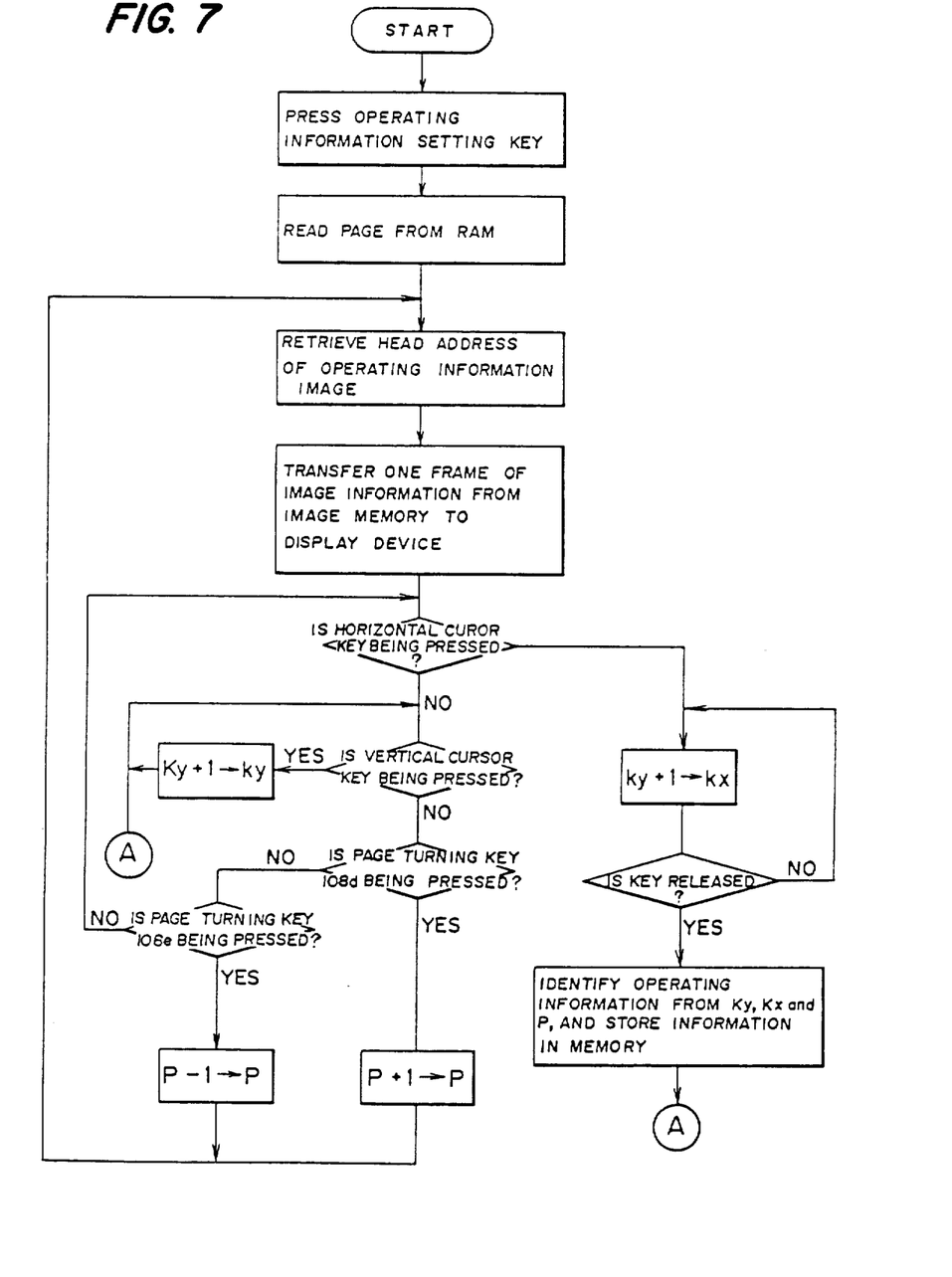
FIG. 7 is a flowchart.
Figure 8:
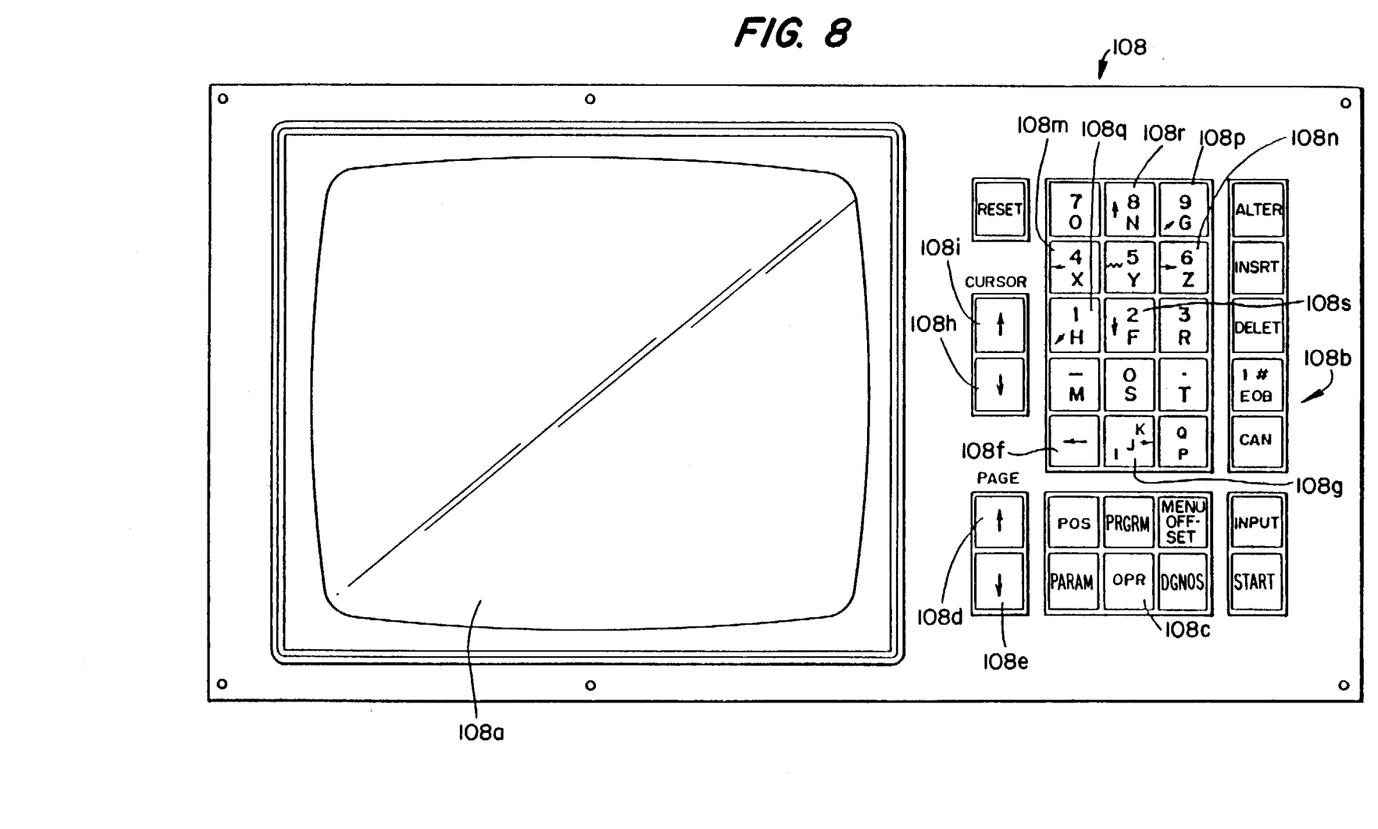
FIG. 8 is a front view of an MDI unit equipped with a display device.

FIG. 6 is a block diagram of a second embodiment of the present invention, where the portion enclosed by the broken line in FIG. 5 comprises a computer. FIG. 7 is a flowchart of processing associated with FIG. 6. FIG. 8 is a front view of an MDI unit equipped with a display device. In FIG. 6, portions similar to those shown in FIG. 5 are designated by like reference characters. Processing for setting operating information will be described hereinafter.

(a) When the operating information setting key 108c on the MDI unit 108 is pressed, a processor 201, which is under the control of a control program stored in a ROM 202, reads the page number P of the operating information out of the page storage area 203a of a RAM 203 and stores P in an internal page counter 201a. Note that the information displayed on the CRT 108a is classified into, e.g., (a) the contents of an NC program, (2) the contents of an offset quantity, (3) the contents of a parameter, (4) the contents of operating information and (5) an alarm. Each display group has display items covering a plurality of pages. Accordingly, the page number P (page one at the time that power is introduced to the system) displayed on the CRT immediately before for each group is stored in the page storage area 203a of the RAM 203a. When it is requested that the images of the respective groups be displayed, the image of the page number P stored in the page storage area 203a is displayed on the CRT 108a.

(b) Next, the processor 201 goes to a table 205 to retrieve the head address Ah of the location storing the image data having the page number P stored in the page counter 201a, and proceeds to store the address in an internal pointer 201b. It should be noted that the table 205 stores, for each display group, the correspondence between the page number and the head address Ah of an image memory 204 at which the image data having the page number is stored.

(c) Thereafter, the processor 201 reads the image data sequentially from the storage area of the image memory 204 indicated by the pointer 201b and delivers the data to a display controller 108a' of the MDI unit 108, whereby the operating information image is displayed on the CRT 108. At the start of operation, the cursor CSR (FIG. 3) appears at the upper left, and the cursors provided for respective ones of the operating information items appear at the selectable item positions selected thus far.

(d) Next, the processor 201 determines whether either of the horizontal shift keys 108f, 108g is being pressed.

(e) If neither of the horizontal shift keys is being depressed, the processor 201 determines whether either of the vertical shift keys 108h, 108i is being pressed. If a vertical shift key is being pressed, the display controller shifts the cursor CSR, and the processor 201 performs the operation:

$$ky \pm 1 \rightarrow ky \qquad (1)$$

to update the contents ky of a cursor pointer 201c in accordance with the direction of the cursor shift. In expression (1) above, the plus sign indicates a case where the cursor CSR is shifted downwardly one line at a time by pressing the vertical shift key 108h, while the minus sign indicates a case where the cursor CSR is shifted upwardly one line at a time by pressing the vertical shift key 108i.

(f) If the vertical shift key is released, the processor 201 determines whether the page turning key 108d for page incrementing is being pressed. If it is, then the processor performs the operation:

$$P + 1 \rightarrow P \qquad (2)$$

to update the contents (page number) of the page counter 201a, and processing from step (b) onward is repeated.

(g) If the page turning key 108d for page incrementing is not pressed in step (f), the processor 201 determines whether the page turning key 108e for page decrementing is being pressed. If the page turning key 108d is not being pressed, processing from step (d) onward is repeated. If the page turning key 108d is being pressed, the processor 201 performs the operation:

$$P - 1 \rightarrow P \qquad (3)$$

to update the contents (page number) of the page counter 201a, and processing from step (b) onward is repeated.

(h) If one of the horizontal shift keys 108f, 108g is being pressed in the discrimation process step (d), the display controller 108a' shifts the cursor (MSC, HAC, HMC, BSC, SBC . . . etc.) of the operating information item indicated by the cursor CSR, and the processor 201 performs the operation:

$$kx \pm 1 \rightarrow kx \qquad (4)$$

to update the contents kx of a cursor pointer 201d in accordance with the direction of the cursor shift. In expression (4) above, the plus sign indicates a case where the cursor is shifted rightward one step at a time by pressing the horizontal shift key 108g, while the minus sign indicates a case where the cursor is shifted leftward one step at a time by pressing the horizontal shift key 108f.

(i) If the horizontal shift key is released, the processor 201 identifies the operating information by using the contents P, ky, kx of the page counter 201a and cursor pointers 201c, 201d, respectively, and then updates, using the operating information, the contents of an operating information memory 206 constituted by a RAM back up by a battery.

It should be noted that when the cursor CSR is positioned at the operating information item "JOG FEED" or "FEED OVRD", the display controller 108a' will alter the length of a bar graph, as shown in FIG. 3(A), if the horizontal shift keys 108f, 108g are pressed. However, the position at the tip of the bar graph will be the cursor position kx.

The foregoing is for a case where all operating information is entered from the MDI unit 108. However, in a case where only some of the operating information is entered from the MDI unit 108, the operating information may be formed into groups, and a group of operating information entered from the MDI unit may be preset as a parameter in a parameter memory 207. With such an arrangement, the processor 201 will first read the parameter out of the parameter memory 207 when the operating information setting key 108c is pressed, and will cause the CRT 108a to display only the operating information item stored as the parameter, as well as the selectable items.

Further, according to the present invention, keys 108m, 108n, 108p, 108q, which are found among numeric keys on the MDI unit 108 (FIG. 8), serve also as jog feed keys. The keys 108m, 108n, 108p, 108q set the particular direction along the particular axis in the parameter memory 207 in the form a parameter. For example, in a milling machine, the keys 108m, 108q, 108n, 108p are set in the parameter memory 207 as the −X direction, +X direction, +Y direction and −Y direction, respectively. In a lathe, the keys 108m, 108q, 108n, 108p are set in the parameter memory 207 as the −Z direction, +Z direction, +X direction and −X direction, respectively. When a movable element is desired to be jog fed to the right or left, one need only press the key 108q or 108m. When the movable element is desired to be moved up or down, it will suffice to press the key 108n or 108p. Thus, it is entirely unnecessary to consider the particular machine coordinate system, unlike the conventional apparatus. The reason is that when one of the keys 108m through 108q is pressed in the jog feed mode, the processor 201 is capable of reading the parameter out of the parameter memory 207 and of recognizing the axis direction of the key pressed. It should be noted that a jog feed is performed by selecting the jog feed mode on the display screen, followed by pressing the prescribed keys 108m through 108q.

According to the present invention, various items of operating information and various selectable items are displayed on the screen of a CRT, and the desired operating information is selected or set while the display is observed. Accordingly, operability is excellent and changeover switches and buttons can be eliminated or reduced to lower the cost of the numerical control apparatus.

Further, operating information that is more convenient to enter from the NC apparatus side can be entered from an MDI unit, and operating information that is more convenient to enter from the machine side can be entered from the operator's panel on the machine side. Thus, operability is enhanced.

Still further, in performing a jog feed, a movable element can be moved in a desired direction absolutely without taking the particular machine coordinate system into consideration. This also enables an improvement in operability.

The present invention is well suited for entering operating information in a numerical control apparatus.

We claim:

1. An operating information input method in a numerical control apparatus having a keyboard, a display device with a screen, non-volatile memory for storing operating information items and which executes prescribed numerical control processing based on numerical control program data and operating information items, said method comprising the steps of:
    (a) designating the start of inputting operating information items;
    (b) displaying on the screen in response to said designating the start of inputting operating information, pages of operating information items and selectable items associated with corresponding ones of said pages of operating information items, in the form of characters;
    (c) entering operating information by positioning a first cursor at a desired operating information item and by positioning a second cursor associated with the desired operating information item at a desired selectable item; and
    (d) storing in the non-volatile memory the desired selectable item identified by the second cursor.

2. An operating information input method in a numerical control apparatus according to claim 1, wherein step (b) includes:
    displaying on the screen each second cursor associated with each operating information item at a position of a selectable item most recently stored in the non-volatile memory.

3. An operating information input method in a numerical control apparatus according to claim 2, wherein step (c) further includes:
    shifting the first cursor vertically on the screen by pressing a vertical shift key on the keyboard to select said desired operating information item, and
    shifting only the second cursor associated with said desired operating information item designated by said first cursor, horizontally on the screen by pressing a horizontal shift key on the keyboard.

4. An operating information input method in a numerical control apparatus according to claim 1, wherein step (b) includes:
    selecting a desired one of said pages of operating information items and associated selectable items to be displayed on the screen by operating a page turning key on the keyboard.

5. An operating information input method in a numerical control apparatus according ot claim 4, wherein a page number is associated with each of said pages of operating information items, and where step (b) further includes:
    displaying on the screen a first cursor for selecting one of said operating information items and a second cursor, corresponding to the cursor, for selecting an item in each of said pages of operating information items, and wherein step (c) includes:
    (i) positioning the first cursor at the desired operating information item,
    (ii) positioning the second cursor associated with said operating information item to select a desired selectable item, and
    (iii) identifying the desired operating information in accordance with the associated page number, the first cursor position, and the second cursor position.

6. An operating information input method in a numerical control apparatus according to claim 1, further comprising the steps of:
    forming said pages of operating information items into groups,
    specifying a group such that only the operating information items and selectable items of said specified group are displayed on the screen in response to designating the start of inputting operating information.

7. An operating information input method in a numerical control apparatus having a keyboard, a display with a screen and which executes prescribed numerical control processing based on numerical control program data and operating information items, said method comprising the steps of:
    (a) desginating the start of inputting operating information items;
    (b) displaying on the screen characters corresponding to a page of said operating information items including selectable items;
    (c) positioning a first cursor on the screen for selecting a disired operating information item;
    (d) moving a second cursor associated with said desired operating information item to identify a selectable item; and
    (e) displaying a bar graph on the screen in accordance with the movement of said second cursor to specify an operating quantity of said identified selectable item in accordance with the length of said graph.

8. An operating information input method in a numerical control apparatus according to claim 7, wherein step (e) includes displaying the operating quantity on the screen in the form of characters.

9. An operating information input method in a numerical control apparatus having a memory, according to claim 7, wherein page numbers are associated with said pages of operating information items and said method further comprises the steps of:
    displaying a different one of said pages of said operating information items on the screen in response to operating a page turning key;
    entering into the memory said desired operating information item and said operating quantity;
    identifying said operating information item and said operating quantity in accordance with a page number associated with said displayed page, the position of the first cursor, and the position of the second cursor.

10. An operating information input method in a numerical control apparatus according to claim 7, further comprising the step of
    forming said pages of operating information items into groups; and
    specifying a group such that only the operating information items of said specified group are displayed on the screen in response to designating the start inputting operating information.

* * * * *